UNITED STATES PATENT OFFICE.

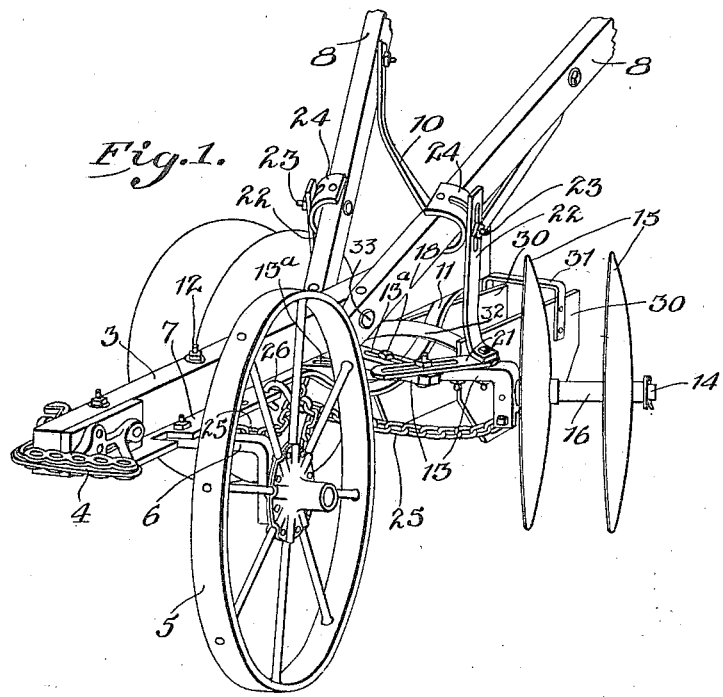

JAMES PLEASANT COPELAND, OF VINEMONT, ALABAMA, ASSIGNOR OF ONE-HALF TO WILLIAM EARL JAMES, OF CULLMAN, ALABAMA.

PLOW AND CULTIVATOR.

1,363,458.      Specification of Letters Patent.      Patented Dec. 28, 1920.

Application filed August 25, 1919. Serial No. 319,650.

*To all whom it may concern:*

Be it known that I, JAMES P. COPELAND, a citizen of the United States, residing at Vinemont, in the county of Cullman and State of Alabama, have invented certain new and useful Improvements in Plows and Cultivators; and I do hereby declare the following to be a full, clear, and exact description of the invention, such as will enable others skilled in the art to which it appertains to make and use the same.

This invention relates to an agricultural implement combining the features of plows and cultivators.

It is an object of the present invention to provide an agricultural implement which can be readily utilized to bar-off cotton or to dirt it up and to plow corn, beans, peas, and other small crops, and to provide an improvement of this kind that can be efficiently drawn by a single draft animal when attached to harness and suitable means which will position the implement to the rear and to one side of the animal so that the rows of plants being cultivated can be efficiently treated with a minimum injury to the growing plants.

Another object of the present invention is to provide an improved implement in which the soil engaging elements can be adjusted for the purpose of deflecting the soil outwardly or the plow can be reset to collect the soil and move it toward or dirt up the rows of plants.

An object of the invention also is to provide an implement of this kind involving adjustably mounted plowing or cultivating elements that can be easily arranged or adjusted according to the services required and function to be performed and which at the same time can be readily secured in the desired adjustments.

Another object of the invention is to provide a plowing and cultivating instrument in which the several parts are comparatively simple and easily manufactured, so that the implement can be produced at relatively low cost and sold at a reasonable price.

With these and other objects in view, as will be manifest to those skilled in the art, the invention consists of the construction, the combination, and in details and arrangement of the parts as more particularly hereinafter described relative to the embodiment of the invention illustrated in the accompanying drawings wherein:

Figure 1 is a perspective view looking toward the front and left hand side of the implement and showing it as organized for plowing the soil up to the plants in a row.

Fig. 2 is a perspective view from the same side looking toward the rear of the implement and showing the outer disk plows removed.

Fig. 3 is a perspective view of one of the detached axle members.

In the illustrated embodiment of the invention the plow or cultivator is shown as comprising a longitudinal beam 3 which may be of wood or other suitable material having at its front end a clevis 4 to which the draft animal can be connected by a suitable harness so that the implement will assume a position generally to one side and in the rear of the animal so as to protect the plants growing in rows with respect to which it might be desirable to turn over the soil as in dirting up the rows or in cultivating.

Preferably the front end of the beam 2 is supported on a narrow faced wheel 5 which is mounted on an L-shaped axle 6 which is detachably connectible to the beam or preferably to a reinforcing and longitudinally extending plate 7 secured by bolts or otherwise to the bottom of the beam, especially when the latter is constructed of wood.

The wheel 5 is positioned by the crank or axle 6 at a suitable distance to the side of the beam so as to follow approximately behind the draft animal.

At a suitable distance back from the front end of the plow beam 3 it is provided with suitable upwardly and rearwardly inclined handles 8, the front and lower ends of which may be bolted as at 9 to the beam and rearwardly extending braces 10 are preferably used to connect the rear end of the plow beam 3 and the handles 8 to steady the same. The lower portion of the plow beam has attached to it an inverted arch or brace member 11 which extends longitudinally along the lower portion of the plow beam and may, if desired, be extended to the front end thereof and fastened by bolts 12, which may be utilized to secure the front reinforcing plate 7 which, if desired, may form a continuation of the inverted bearing or arch member 11, the rearmost end of which is brought up against and bolted to the end of the beam, as at 12ª.

One of the important features of my present invention resides in the peculiar organization for connecting the plow disks to the plow beam and for enabling the disks to be set for the purpose of drawing the soil outwardly from a longitudinal vertical plane through the plow beam or for throwing the dirt toward said plane, for instance, when throwing the dirt up along a row being cultivated.

To the accomplishment of these ends the plow mounting organization comprises a pair of substantially L-shaped axle members 13 having at the end of each bearing spindle 14 on which may be arranged any suitable number of plow disks 15 each having the usual hub or journal member to fit the spindle 14.

In Fig. 1 a pair of plow disks 15 is shown as arranged in parallelism on the spindle 14, the disks being spaced from each other by a spacing sleeve or collar 16 keyed or otherwise held in place as by a cotter pin 17, one of which may be passed through the outer end of the spindle to hold the outermost disk in place.

The horizontal arms of the L-shaped axle members 13 are perforated as by a longitudinal slot 13ª, although obviously, this may be substituted by a row of apertures so that there may be passed through the overlapped and oppositely directed bodies of the axle members a central king or securing bolt 18 which substantially forms an axis about which the axle members 13 may be set with relation to each other crosswise and at any desired angle, or, if desired, may be secured in alinement.

This, therefore, forms means by which the spindles 14 of the axle members can be directed divergently forward of the axis bolt 18 or divergently rearwardly of the axis bolt 18, according to the purpose for which the implement may be used.

The outer ends of each of the horizontal arms of the axle members 13 may be provided with apertures to take fastening bolts 20 which are designed to be passed through apertures provided therefor in brace links 21, the opposite ends of which are bolted to the other arm of the companion axle member 13 thereby securely bracing the two members together in any desired angular position with respect to each other.

For further securing the position of the thus connected axle members or to prevent them from swinging about the axis bolt 18 suitable braces 22 are also bolted to the arms of the axle members 13 and have their upper ends bolted or otherwise fastened to the plow beam structure or to the handles thereof as, for instance, by bolts 23, which pass through slotted bearings 24 fastened to the beam or handle members as the case may be.

The slotting of the bearing member enables the shifting of the adjacent end of the brace 22 in accordance with its change in position according to the adjustment of the axle members 13.

An additional bracing device may be utilized if desired and such may consist of chains 25 connected to the downwardly extending leg of the axle members 13 and extended forwardly and connected as by hooks 26 or otherwise to the reinforcing plate 7.

Obviously, rods may be substituted for the brace chains 25.

From the above it will be seen that when the implement is in use the strains to which the disks and their axles are subjected are carried almost wholly by the longitudinal arch member 11, which is extended forwardly and connected by the bolts 12 to the beam and to which arch member the tension of the draft animal may be applied through the clevis 4 at the front end of the plow.

In some uses of the device it may be desirable to help heap up the dirt along rows of plants being cultivated and to that end there is shown in Fig. 1 a pair of detachable fenders or mold board-like members 30, which are set substantially in parallelism and are connected at their rear ends as by a transverse bow or brace 31, while the front ends of the fenders 30 are appropriately attached to the beam structure, as by means of a fastening bolt.

In Fig. 1 I have illustrated suitable means for securing the fenders to the beam which includes the arms 32, having one end attached to the fenders and the other end attached to the plow beam which, in the present instance, is secured by the transverse bolt 33. It will be understood that the upper ends of the arms 32 may be secured by a separate bolt than the one which holds the handles 8 in place.

These fenders have been omitted from Fig. 2 for the purpose of enabling the clear disclosure of the axle organization therein.

What I claim is:

1. In a plowing and cultivating implement having a beam with draft means, the combination of an inverted arch member secured to said beam, a pair of axles in crossed relation pivotally secured to said arched member, links connecting the adjacent ends of said axles and means for securing said axles against rotation.

2. In a plowing and cultivating implement having a beam with draft means, the combination of an inverted arch member, a pair of axles having each a longitudinal slot, arranged in crossed relation and pivotally secured to said arched member, links connecting the adjacent ends of said axles to secure same in adjusted angular relation to each other and means for bracing said axles against rotation on their common pivot.

In testimony whereof I affix my signature in presence of two witnesses.

JAMES PLEASANT COPELAND.

Witnesses:
FRED. E. JAMES,
WILLIAM E. JAMES.